United States Patent
Schultz et al.

(10) Patent No.: US 9,815,067 B2
(45) Date of Patent: Nov. 14, 2017

(54) ELECTRET WEBS WITH CHARGE-ENHANCING ADDITIVES

(71) Applicant: 3M INNOVATIVE PROPERTIES COMPANY, St. Paul, MN (US)

(72) Inventors: Nathan E. Schultz, Lakeland, MN (US); Fuming B. Li, Woodbury, MN (US); John M. Sebastian, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 99 days.

(21) Appl. No.: 14/784,634

(22) PCT Filed: Apr. 15, 2014

(86) PCT No.: PCT/US2014/034076
§ 371 (c)(1),
(2) Date: Oct. 15, 2015

(87) PCT Pub. No.: WO2014/172308
PCT Pub. Date: Oct. 23, 2014

(65) Prior Publication Data
US 2016/0067717 A1    Mar. 10, 2016

Related U.S. Application Data

(60) Provisional application No. 61/813,682, filed on Apr. 19, 2013.

(51) Int. Cl.
B03C 3/28 (2006.01)
B01D 39/16 (2006.01)
H01B 1/12 (2006.01)

(52) U.S. Cl.
CPC ............ *B03C 3/28* (2013.01); *B01D 39/1607* (2013.01); *B01D 39/1623* (2013.01); *H01B 1/12* (2013.01); *B01D 2239/0435* (2013.01)

(58) Field of Classification Search
CPC combination set(s) only.
See application file for complete search history.

(56) References Cited

U.S. PATENT DOCUMENTS

| | | | |
|---|---|---|---|
| 3,971,373 A | 7/1976 | Braun | |
| 4,100,324 A | 7/1978 | Anderson | |
| 4,118,531 A | 10/1978 | Hauser | |
| 4,215,682 A | 8/1980 | Kubik | |
| 4,264,750 A | 4/1981 | Anand | |
| RE30,782 E | 10/1981 | Van Turnhout | |
| 4,340,563 A | 7/1982 | Appel | |
| 4,375,718 A | 3/1983 | Wadsworth | |
| RE31,285 E | 6/1983 | Van Turnhout | |
| 4,429,001 A | 1/1984 | Kolpin | |
| 4,508,781 A | 4/1985 | Yagi | |
| 4,557,945 A | 12/1985 | Yagi | |
| 4,588,537 A | 5/1986 | Klaase | |
| RE32,171 E | 6/1986 | Van Turnhout | |
| 4,592,815 A | 6/1986 | Nakao | |
| 4,652,282 A | 3/1987 | Ohmori | |
| 4,789,504 A | 12/1988 | Ohmori | |
| 4,874,659 A | 10/1989 | Ando | |
| 5,057,710 A | 10/1991 | Nishiura | |
| 5,401,446 A | 3/1995 | Tsai | |
| 5,496,507 A | 3/1996 | Angadjivand | |
| 5,908,598 A | 6/1999 | Rouseau | |
| 5,914,186 A | 6/1999 | Yau | |
| 5,919,847 A | 7/1999 | Rousseau | |
| 5,968,635 A | 10/1999 | Rousseau | |
| 5,976,208 A | 11/1999 | Rousseau | |
| 6,213,122 B1 | 4/2001 | Rousseau | |
| 6,214,094 B1 | 4/2001 | Rousseau | |
| 6,238,466 B1 | 5/2001 | Rousseau | |
| 6,268,495 B1 * | 7/2001 | Rousseau ............... | B01D 39/08 428/198 |
| 6,365,088 B1 | 4/2002 | Knight | |
| 6,375,886 B1 | 4/2002 | Angadjivand | |
| 6,397,458 B1 | 6/2002 | Jones | |
| 6,398,847 B1 | 6/2002 | Jones | |
| 6,406,657 B1 | 6/2002 | Eitzman | |
| 6,409,806 B1 | 6/2002 | Jones | |
| 6,419,871 B1 | 7/2002 | Ogale | |
| 6,432,175 B1 | 8/2002 | Jones | |
| 6,454,986 B1 | 9/2002 | Eitzman | |
| 6,524,488 B1 | 2/2003 | Insley | |
| 6,562,112 B2 | 5/2003 | Jones | |
| 6,660,210 B2 | 12/2003 | Jones | |
| 6,743,464 B1 | 6/2004 | Insley | |
| 6,808,551 B2 | 10/2004 | Jones | |
| 6,824,718 B2 | 11/2004 | Eitzman | |
| 7,244,291 B2 | 7/2007 | Spartz | |

(Continued)

FOREIGN PATENT DOCUMENTS

| | | |
|---|---|---|
| EP | 447166 | 9/1991 |
| EP | 623941 | 11/1994 |
| JP | 06254319 | 9/1994 |
| JP | 08284063 | 10/1996 |
| JP | 2001-037863 | 2/2001 |
| JP | 2004-066595 | 3/2004 |
| WO | WO 93-14510 | 7/1993 |
| WO | WO 01-07144 | 2/2001 |
| WO | WO 2009-076064 | 6/2009 |
| WO | WO 2009-148744 | 12/2009 |
| WO | WO 2009-148747 | 12/2009 |
| WO | WO 2010-114742 | 10/2010 |
| WO | WO 2012-025451 | 3/2012 |

OTHER PUBLICATIONS

Davies, "The Separation of Airborne Dust and Particles," The Institution of Mechanical Engineers, Proceedings (B), 1952-53, vol. 1B, No. 1-12, pp. 185-198.

(Continued)

*Primary Examiner* — Duane Smith
*Assistant Examiner* — Sonji Turner
(74) *Attorney, Agent, or Firm* — Jeffrey M. Olofson

(57) ABSTRACT

Electret webs include a thermoplastic resin and a charge-enhancing additive. The charge-enhancing additive is an arylamino-substituted benzoic acid or an arylamino-substituted benzoic acid salt. The electret webs may be a nonwoven fibrous web or a film. The electret webs are suitable for use as filter media.

20 Claims, No Drawings

(56) References Cited

U.S. PATENT DOCUMENTS

| | | |
|---|---|---|
| 7,244,292 B2 | 7/2007 | Kirk |
| 7,390,351 B2 | 6/2008 | Leir |
| 7,765,698 B2 | 8/2010 | Sebastian |
| 8,162,153 B2 | 4/2012 | Fox |
| 8,529,671 B2 * | 9/2013 | Sebastian ............ B01D 39/1623 442/110 |
| 8,613,795 B2 * | 12/2013 | Li ............................ D01F 1/10 264/423 |
| 8,790,449 B2 * | 7/2014 | Li ...................... B01D 39/1623 264/423 |
| 2002/0174869 A1 | 11/2002 | Gahan |
| 2003/0134515 A1 | 7/2003 | David |
| 2008/0038976 A1 | 2/2008 | Berrigan |

OTHER PUBLICATIONS

Grossweiner, "A Note on the Analysis of First-Order Glow Curves". Journal of Applied Physics, 1953, vol. 24, No. 10, pp. 1306-1307.

Shimizu, "Effects of Zinc 2-Mercaptobenzimidazolate on Pregnant Rats by Oral Treatment", Journal of Health Science, Apr. 1999, vol. 45, No. 4, pp. 184-190.

Kruszynski, "Structure and properties of the sodium, potassium and calcium salts of 2-(2, 3-dimethylphenyl) aminobenzoic acid", Journal of Molecular Structure, 2010, vol. 970, pp. 79-89, XP55143563A.

Waker, "Application of Cavity Theory to the Discharge of Electrostatic Dust Filters by x-Rays", Applied Radiation and Isotopes, 1988, vol. 39, No. 7, pp. 677-684.

Wente, "Manufacture of Super Fine Organic Fibers", Naval Research Laboratories Report No. 4364, May 25, 1954, 23pgs.

Wente, "Superfine Thermoplastic Fibers," Industrial Engineering Chemistry, 1956, vol. 48, No. 8, pp. 1342-1346.

International Search Report for PCT International Application No. PCT/US2014/034076, dated Oct. 10, 2014. 4pgs.

* cited by examiner

ELECTRET WEBS WITH CHARGE-ENHANCING ADDITIVES

CROSS REFERENCE TO RELATED APPLICATIONS

This application is a national stage filing under 35 U.S.C. 371 of PCT/US2014/034076, filed Apr. 15, 2014, which claims priority to US Provisional Application No. 61/813,682, filed Apr. 19, 2013, the disclosure of which is incorporated by reference in its/their entirety herein.

FIELD OF THE DISCLOSURE

This disclosure relates to electret webs, including non-woven fibrous webs such as non-woven thermoplastic microfiber webs, containing charge-enhancing additives and uses thereof.

BACKGROUND

An electret is a dielectric material that exhibits a quasi-permanent electrical charge. Electrets are useful in a variety of devices including, e.g. cling films, air filters, filtering facepieces, and respirators, and as electrostatic elements in electro-acoustic devices such as microphones, headphones, and electrostatic recorders.

The performance of microfibrous webs used for aerosol filtration can be improved by imparting an electrical charge to the fibers, forming an electret material. In particular, electrets are effective in enhancing particle capture in aerosol filters. A number of methods are known for forming electret materials in microfibrous webs. Such methods include, for example, bombarding melt-blown fibers as they issue from the die orifices, as the fibers are formed, with electrically charged particles such as electrons or ions. Other methods include, for example, charging the fibers after the web is formed, by means of a corona discharge or imparting a charge to the fiber mat by means of carding and/or needle tacking (tribocharging). In addition, a method in which jets of water or a stream of water droplets impinge on a non-woven web at a pressure sufficient to provide filtration enhancing electret charge has also been described (hydrocharging).

A number of materials have been added to polymeric compositions to modify the properties of the polymeric composition. For example, in U.S. Pat. No. 5,914,186 (Yau et al.), heat-resistant anti-static pressure sensitive adhesive tapes are described that comprise a substrate having coated on it a microparticle adhesive having a diameter of at least 1 micrometer. The microparticles have a conductive coating formed from a polymer electrolyte base polymer, at least one ionic salt of an alkali or alkaline earth metal, and at least one thermal stabilizer selected from the group consisting of hindered amines, salts of substituted toluimidazoles, and mixtures thereof.

Examples of electrets that have additives added include electrets with antibacterial additives as described in Japanese Patent Publication JP 08284063 which describes N-n-butylcarbamic acid 3-9 iodo-2-propynyl ester containing either an amidine or guanidine group, and 2-(4-thiazolyl) benzimidazole, and PCT Publication WO 93/14510 which describes hindered amine compounds, nitrogenous hindered phenol compounds, metallic salt hindered phenol compounds, phenol compounds, sulfur compounds, and phosphorous compounds. Japanese Patent Publication JP 06254319 describes the use of metal salts of long chain organic acids in polyolefin electrets to lessen the attenuation of the electrification quantity. European Patent Publication No. EP 623,941 describes the use of Charge Control Agents from various chemical classes in polymer electrets.

Also described are processes for producing high stability electrets, such as European Patent Publication No. EP 447,166 which describes a process for producing electrets comprising alternating at least two cycles of applying electric charge and subsequently heating, and also describes electrets containing polar high-molecular weight compounds, and U.S. Pat. No. 4,874,659 (Ando et al.) which describes a process comprising placing a fiber sheet between a non-contact voltage-applied electrode and an earth electrode and supplying electricity between the electrodes.

SUMMARY

Described herein are electret webs and electret filter media. The electret webs may be a non-woven fibrous web or a film. The electret webs comprise a thermoplastic resin and a charge-enhancing additive comprising an arylamino-substituted benzoic acid or an arylamino-substituted benzoic acid salt. The electret webs are suitable for use as filter media.

DETAILED DESCRIPTION

The need remains for electret webs with improved properties. Presented in this disclosure are electret webs containing charge-enhancing additives. These charge-enhancing additives provide electret webs that are easy to charge by a variety of different charging mechanisms such as tribocharging, corona discharge, hydrocharging or a combination thereof. In some embodiments, the electret webs of this disclosure are capable of being charged by corona discharge alone, particularly DC corona discharge, without the need for additional charging mechanisms.

Electret webs useful in the present disclosure include a blend of a thermoplastic resin and a charge-enhancing additive. Webs prepared from such blends can show enhanced properties over webs prepared with the thermoplastic resins alone. Useful charge-enhancing additives include arylamino-substituted benzoic acids or arylamino-substituted benzoic acid salts.

The electret webs may be in a variety of forms. For example the web may be a continuous or discontinuous film, or a fibrous web. Fibrous webs are particularly useful for the formation of filtration medium. In some embodiments the web is a non-woven microfibrous web. Typically microfibers are 1-100 micrometers, or more typically 2-30 micrometers in effective diameter (or average diameter if measured by a method such as scanning electron microscopy) and the microfibers need not have a circular cross-section.

The terms "a", "an", and "the" are used interchangeably with "at least one" to mean one or more of the elements being described.

The term "electret" refers to a material that exhibits a quasi-permanent electric charge. The electric charge may be characterized by the X-ray Discharge Test as described in the examples section.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl (t-butyl), n-pentyl, n-hexyl, cyclohexyl, n-heptyl, n-octyl, and ethylhexyl.

The term "heteroalkyl" refers to an alkyl group which contains heteroatoms. These heteroatoms may be pendant atoms, for example, halogens such as fluorine, chlorine, bromine, or iodine or catenary atoms such as nitrogen, oxygen or sulfur. An example of a heteroalkyl group is a polyoxyalkyl group such as $-CH_2CH_2(OCH_2CH_2)_n OCH_2CH_3$.

The term "alkoxy" refers to a group of the type $-OR$, where R is an alkyl, substituted alkyl, aryl, or aralkyl group.

The term "substituted alkyl" refers to an alkyl group which contains substituents along the hydrocarbon backbone. These substituents may be alkyl groups, heteroalkyl groups or aryl groups. An example of a substituted alkyl group is a benzyl group.

The term "aryl" refers to an aromatic carbocyclic group that is a radical containing 1 to 5 rings which may be connected or fused. The aryl group may be substituted with alkyl or heteroalkyl groups. Examples of aryl groups include phenyl groups, naphthalene groups and anthracene groups.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

The term "hot melt processable" as used herein, refers to a composition that can transform, for example, by heat and pressure from a solid to a viscous fluid. The composition should be capable of being hot melt processed without being substantially chemically transformed, degraded or rendered unusable for the intended application.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Thermoplastic resins useful in the present disclosure include any thermoplastic nonconductive polymer capable of retaining a high quantity of trapped electrostatic charge when formed into a web and charged. Typically, such resins have a DC (direct current) resistivity of greater than $10^{14}$ ohm-cm at the temperature of intended use. Polymers capable of acquiring a trapped charge include polyolefins such as polypropylene, polyethylene, and poly-4-methyl-1-pentene; polyvinyl chloride; polystyrene; polycarbonates; polyesters, including polylactides; and perfluorinated polymers and copolymers. Particularly useful materials include polypropylene, poly-4-methyl-1-pentene, blends thereof or copolymers formed from at least one of propylene and 4-methyl-1-pentene.

Examples of suitable thermoplastic resins include, for example, the polypropylene resins: ESCORENE PP 3746G commercially available from Exxon-Mobil Corporation, Irving, Tex.; TOTAL PP3960, TOTAL PP3860, and TOTAL PP3868 commercially available from Total Petrochemicals USA Inc., Houston, Tex.; and METOCENE MF 650W commercially available from LyondellBasell Industries, Inc., Rotterdam, Netherlands; and the poly-4-methyl-1-pentene resin TPX-MX002 commercially available from Mitsui Chemicals, Inc., Tokyo, Japan.

The charge-enhancing additives are arylamino-substituted benzoic acids or arylamino-substituted benzoic acid salts. These salts may be metal-containing salts and may be salts of monovalent, divalent or trivalent metals.

The arylamino-substituted benzoic acid can be described by the general structure of Formula 1 shown below:

$$HO_2C-(C_6H_4)-NR^1-(C_6R^2R^3R^4R^5R^6) \quad \text{Formula 1}$$

wherein the group $HO_2C$-represents a carboxylic acid group; $-(C_6H_4)-$ represents a disubstituted phenyl ring; the group $-(C_6R^2R^3R^4R^5R^6)$ represents an aryl ring; $R^1$ comprises a hydrogen atom, or an alkyl group; the groups $R^2$, $R^3$, $R^4$, $R^5$, and $R^6$ independently comprise a hydrogen atom, an alkyl group, an aryl group, a heteroalkyl group, a substituted alkyl group, a substituted aryl group, or an alkoxy group. The arylamino group may be located at the 2 position of the benzoic acid ring (ortho-arylamino benzoic acid), at the 3 position of the benzoic acid ring (meta-arylamino benzoic acid), or at the 4 position of the benzoic acid ring (para-arylamino benzoic acid). Similarly, in the benzoic acid salts, the arylamino group may be located at the 2 position of the benzoic acid ring (ortho-arylamino benzoate), at the 3 position of the benzoic acid ring (meta-arylamino benzoate), or at the 4 position of the benzoic acid ring (para-arylamino benzoate).

In some embodiments, the charge-enhancing additive comprises an arylamino-substituted benzoic acid which is a substituted or unsubstituted 2-phenylamino benzoic acid, 3-phenylamino benzoic acid, 4-phenylamino benzoic acid or combination thereof. By substituted 2-phenylamino benzoic acid, it is meant that at least one of $R^2$-$R^6$ is a group other than a hydrogen atom. Examples of suitable arylamino-substituted benzoic acids are substituted and unsubstituted fenamic acid and mefenamic acid. Fenamic acid is 2-(phenylamino)benzoic acid (using Formula 1 above, each of the $R^1$-$R^6$ groups is an H atom), and mefenamic acid is 2-(2,3-dimethylphenyl)aminobenzoic acid (using Formula 1 above, the $R^1$, $R^4$, $R^5$, and $R^6$ groups are each an H atom, the $R^2$ and $R^3$ groups are each a methyl group). Substituted fenamic acids (where one or more of the $R^2$-$R^6$ groups is not an H atom), or substituted mefenamic acids (where one or more of the $R^4$-$R^6$ groups is not an H atom) are also suitable.

In some embodiments, the charge-enhancing additive comprises an arylamino-substituted benzoic acid salt. These salts typically are metal-containing salts and may be salts of monovalent metals, divalent metals or trivalent metals. These metal-containing salts can be described generally by Formula 2 below.

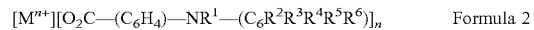

$$[M^{n+}][O_2C-(C_6H_4)-NR^1-(C_6R^2R^3R^4R^5R^6)]_n \quad \text{Formula 2}$$

wherein M is an n-valent metal ion, where n=1, 2, or 3; the group $O_2C-$ represents a carboxylate group; $-(C_6H_4)-$ represents a disubstituted phenyl ring; the group $-(C_6R^2R^3R^4R^5R^6)$ represents an aryl ring; $R^1$ comprises a hydrogen atom, or an alkyl group; the groups $R^2$, $R^3$, $R^4$, $R^5$, and $R^6$ independently comprise a hydrogen atom, an alkyl group, an aryl group, a heteroalkyl group, a substituted alkyl group, a substituted aryl group, or an alkoxy group. The arylamino group may be located at the 2 position of the benzoic acid ring (ortho-arylamino benzoate), at the 3 position of the benzoic acid ring (meta-arylamino benzoate), or at the 4 position of the benzoic acid ring (para-arylamino benzoate).

In some embodiments, the charge-enhancing additive is a monovalent metal-containing arylamino-substituted benzoic acid salt, that is to say a salt of Formula 2 where n=1. Examples of monovalent metal ions are sodium ions and lithium ions. Examples of suitable salts include substituted or unsubstituted fenamate or mefenamate salts of sodium or lithium. Fenamate is 2-(phenylamino)benzoate (using Formula 2 above, each of the $R^1$-$R^6$ groups is an H atom), and mefenamate is 2-(2,3-dimethylphenyl)aminobenzoate (using Formula 2 above, the $R^1$, $R^4$, $R^5$, and $R^6$ groups are each an H atom, the $R^2$ and $R^3$ groups are each a methyl group). Substituted fenamates (where one or more of the $R^2$-$R^6$ groups is not an H atom), or substituted mefenamates (where one or more of the $R^4$-$R^6$ groups is not an H atom) are also suitable.

In some embodiments, the charge-enhancing additive is a divalent metal-containing arylamino-substituted benzoic acid salt, that is to say a salt of Formula 2 where n=2. Examples of divalent metal ions include magnesium ions, calcium ions, and zinc ions. Examples of suitable salts include substituted or unsubstituted fenamate or mefenamate salts of magnesium, calcium or zinc. Fenamate is 2-(phenylamino)benzoate (using Formula 2 above, each of the $R^1$-$R^6$ groups is an H atom), and mefenamate is 2-(2,3-dimethylphenyl)aminobenzoate (using Formula 2 above, the $R^1$, $R^4$, $R^5$, and $R^6$ groups are each an H atom, the $R^2$ and $R^3$ groups are each a methyl group). Substituted fenamates (where one or more of the $R^2$-$R^6$ groups is not an H atom), or substituted mefenamates (where one or more of the $R^4$-$R^6$ groups is not an H atom) are also suitable. Substituted or unsubstituted mefenamate salts of divalent metal ions are particularly suitable charge-enhancing additives.

One particularly suitable charge-enhancing additive is magnesium mefenamate, or the magnesium 2-(2,3-dimethylphenyl)aminobenzoate salt. This salt is described by Formula 3 below and the preparation of this salt is described in the Examples section below.

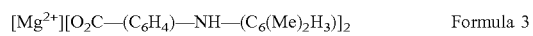

$$[Mg^{2+}][O_2C\text{—}(C_6H_4)\text{—}NH\text{—}(C_6(Me)_2H_3)]_2 \quad \text{Formula 3}$$

wherein $Mg^{2+}$ is a divalent magnesium ion; the group $O_2C$— represents a carboxylate group; —$(C_6H_4)$— represents the 1,2-disubstituted phenyl ring; and the group —$(C_6(Me)_2H_3)$ represents the 2,3-dimethyl substituted aryl ring. Whereas many of the other charge-enhancing additives described herein are known compounds and many are commercially available, this salt was synthesized and is believed to be a previously unknown salt.

In some embodiments, the charge-enhancing additive is a trivalent metal-containing arylamino-substituted benzoic acid salt, that is to say a salt of Formula 2 where n=3. An example of a trivalent metal ion is aluminum ion. Examples of suitable salts include substituted or unsubstituted fenamate or mefenamate salts of aluminum. Fenamate is 2-(phenylamino)benzoate (using Formula 2 above, each of the $R^1$-$R^6$ groups is an H atom), and mefenamate is 2-(2,3-dimethylphenyl)aminobenzoate (using Formula 2 above, the $R^1$, $R^4$, $R^5$, and $R^6$ groups are each an H atom, the $R^2$ and $R^3$ groups are each a methyl group). Substituted fenamates (where one or more of the $R^2$-$R^6$ groups is not an H atom), or substituted mefenamates (where one or more of the $R^4$-$R^6$ groups is not an H atom) are also suitable.

In some embodiments, the arylamino-substituted benzoic acid or salt may contain alkoxy substituents on the arylamino ring. Examples of alkoxy substituents include, for example, methoxy (—$OCH_3$), ethoxy (—$OCH_2CH_3$), n-propoxy (—$OCH_2CH_2CH_3$) and the like. The alkoxy substituents may be located at a variety of positions on the arylamino ring. One particularly suitable salt is the magnesium salt of 2-[(2-ethoxyphenyl)amino]-benzoate.

The charge-enhancing additive can be added in any suitable amount. The charge-enhancing additives of this disclosure have been shown to be effective even in relatively small quantities. Typically the charge-enhancing additive is present in a thermoplastic resin and charge-enhancing additive blend in amounts of up to about 10% by weight, more typically in the range of 0.02 to 5% by weight based upon the total weight of the blend. In some embodiments, the charge-enhancing additive is present in an amount ranging from 0.1 to 3% by weight, 0.1 to 2% by weight, 0.2 to 1.0% by weight, or 0.25 to 0.5% by weight.

The blend of the thermoplastic resin and the charge-enhancing additive can be prepared by well-known methods. Typically, the blend is processed using melt extrusion techniques, so the blend may be preblended to form pellets in a batch process, or the thermoplastic resin and the charge-enhancing additive may be mixed in the extruder in a continuous process. Where a continuous process is used, the thermoplastic resin and the charge-enhancing additive may be pre-mixed as solids or added separately to the extruder and allowed to mix in the molten state.

Examples of melt mixers that may be used to form preblended pellets include those that provide dispersive mixing, distributive mixing, or a combination of dispersive and distributive mixing. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

Examples of extruders that may be used to extrude preblended pellets prepared by a batch process include the same types of equipment described above for continuous processing. Useful extrusion conditions are generally those which are suitable for extruding the resin without the additive.

The extruded blend of thermoplastic resin and charge-enhancing additive may be cast or coated into films or sheets or may be formed into a fibrous web using any suitable techniques. Films can be made into a variety of articles including filtration media by the methods described in, for example, U.S. Pat. No. 6,524,488 (Insley et al.). Fibrous webs can be made from a variety of fiber types including, for example, melt-blown microfibers, staple fibers, fibrillated films, and combinations thereof. Techniques for preparing fibrous webs include, for example, air laid processes, wet laid processes, hydro-entanglement, spunbond processes, melt-blown processes, and combinations thereof. Melt-blown and spunbond, non-woven microfibrous webs are particularly useful as filtration media.

Melt-blown and spunbond, non-woven microfibrous electret filters are especially useful as an air filter element of a respirator, such as a filtering facepiece, or for such purposes as home and industrial air-conditioners, air cleaners, vacuum cleaners, medical air line filters, and air conditioning systems for vehicles and common equipment, such as computers, computer disk drives and electronic equipment. In some embodiments, the electret filters are combined with a respirator assembly to form a respiratory device designed to be used by a person. In respirator uses, the electret filters may be in the form of molded, pleated, or folded half-face respirators, replaceable cartridges or canisters, or prefilters.

Melt-blown microfibers useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Spunbond microfibers may be formed using a spunbond process in which one or more continuous polymeric free-fibers are extruded onto a collector, as described, for example, in U.S. Pat. Nos. 4,340,563 and 8,162,153 and US Patent Publication No. 2008/0038976.

Useful melt-blown and spunbond microfibers for fibrous electret filters typically have an effective fiber diameter of from about 1-100 micrometers, more typically 2 to 30 micrometers, in some embodiments from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Generally, no more than about 90 weight percent staple fibers are present, more typically no more than about 70 weight percent. Examples of webs containing staple fiber are disclosed in U.S. Pat. No. 4,118,531 (Hauser).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Various optional additives can be blended with the thermoplastic composition including, for example, pigments, light stabilizers, primary and secondary antioxidants, metal deactivators, hindered amines, hindered phenols, fatty acid metal salts, triester phosphites, phosphoric acid salts, fluorine-containing compounds and combinations thereof. Particularly suitable additives include HALS (Hindered Amine Light Stabilizers) and antioxidants, as these may also act as charge-enhancing additives. In addition, other charge-enhancing additives may be combined with the thermoplastic composition. Possible charge additives include thermally stable organic triazine compounds or oligomers, which compounds or oligomers contain at least one nitrogen atom in addition to those in the triazine ring, see, for example, U.S. Pat. Nos. 6,268,495, 5,976,208, 5,968,635, 5,919,847, and 5,908,598 to Rousseau et al. Another additive known to enhance electrets is "CHIMASSORB 944: (poly[[6-(1,1,3, 3,-tetramethylbutyl)amino]-s-triazine-2,4-diyl][[(2,2,6,6-tetramethyl-4-piperidyl)imino]hexamethylene [(2,2,6,6-tetramethyl-4-piperidyl)imino]]), available from BASF, Ludwigshafen, Germany. The charge-enhancing additives may be N-substituted amino aromatic compounds, particularly tri-amino substituted compounds, such as 2,4,6-tri-anilino-p-(carbo-2'-ethylhexyl-1'-oxy)-1,3,5-triazine commercially available as "UVINUL T-150" from BASF, Ludwigshafen, Germany. Another charge additive is 2,4,6-tris-(octadecylamino)-triazine, also known as tristearyl melamine ("TSM"). Further examples of charge-enhancing additives are provided in U.S. Patent Application Ser. No. 61/058,029, U.S. Patent Application Ser. No. 61/058,041, U.S. Pat. No. 7,390,351 (Leir et al.), U.S. Pat. No. 5,057,710 (Nishiura et al.), and U.S. Pat. Nos. 4,652,282 and 4,789,504 (Ohmori et al.).

In addition the web may be treated to chemically modify its surface. Surface fluorination can be achieved by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. This plasma fluorination process causes fluorine atoms to become present on the surface of the polymeric article. The plasma fluorination process is described in a number of U.S. Pat. Nos. 6,397,458, 6,398,847, 6,409,806, 6,432,175, 6,562, 112, 6,660,210, and 6,808,551 to Jones/Lyons et al. Electret articles that have a high fluorosaturation ratio are described in U.S. Pat. No. 7,244,291 to Spartz et al., and electret articles that have a low fluorosaturation ratio, in conjunction with heteroatoms, is described in U.S. Pat. No. 7,244,292 to Kirk et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

The electret filter media prepared according to the present disclosure generally have a basis weight (mass per unit area) in the range of about 10 to 500 g/m$^2$, and in some embodiments, about 10 to 100 g/m$^2$. In making melt-blown microfiber webs, the basis weight can be controlled, for example, by changing either the collector speed or the die throughput. The thickness of the filter medium is typically about 0.25 to 20 millimeters, and in some embodiments, about 0.5 to 2 millimeters. Multiple layers of fibrous electret webs are commonly used in filter elements. The solidity of the fibrous electret web typically is about 1% to 25%, more typically about 3% to 10%. Solidity is a unitless parameter that defines the solids fraction of the web. Generally the methods of this disclosure provide electret webs with generally uniform charge distribution throughout the web without regard to basis weight, thickness, or solidity of the medium. The electret filter medium and the resin from which it is produced should not be subjected to any unnecessary treatment which might increase its electrical conductivity, e.g., exposure to ionizing radiation, gamma rays, ultraviolet irradiation, pyrolysis, oxidation, etc.

The electret web may be charged as it is formed or the web may be charged after the web is formed. In electret filter medium, the medium is generally charged after the web is formed. In general, any standard charging method known in the art may be used. For example, charging may be carried out in a variety of ways, including tribocharging, corona discharge and hydrocharging. A combination of methods may also be used. As mentioned above, in some embodiments, the electret webs of this disclosure have the desirable feature of being capable of being charged by corona discharge alone, particularly DC corona discharge, without the need of additional charging methods.

Examples of suitable corona discharge processes are described in U.S. Pat. Re. No. 30,782 (van Turnhout), U.S.

Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), U.S. Pat. No. 4,592,815 (Nakao), and U.S. Pat. No. 6,365,088 (Knight et al.).

Another technique that can be used to charge the electret web is hydrocharging. Hydrocharging of the web is carried out by contacting the fibers with water in a manner sufficient to impart a charge to the fibers, followed by drying of the web. One example of hydrocharging involves impinging jets of water or a stream of water droplets onto the web at a pressure sufficient to provide the web with filtration enhancing electret charge, and then drying the web. The pressure necessary to achieve optimum results varies depending on the type of sprayer used, the type of polymer from which the web is formed, the type and concentration of additives to the polymer, the thickness and density of the web and whether pre-treatment, such as corona surface treatment, was carried out prior to hydrocharging. Generally, water pressures in the range of about 10 to 500 psi (69 to 3450 kPa) are suitable. The jets of water or stream of water droplets can be provided by any suitable spray device. One example of a useful spray device is the apparatus used for hydraulically entangling fibers. An example of a suitable method of hydrocharging is described in U.S. Pat. No. 5,496,507 (Angadjivand et al.). Other methods are described in U.S. Pat. No. 6,824,718 (Eitzman et al.), U.S. Pat. No. 6,743,464 (Insley et al.), U.S. Pat. No. 6,454,986 (Eitzman et al.), U.S. Pat. No. 6,406,657 (Eitzman et al.), and U.S. Pat. No. 6,375,886 (Angadjivand et al.). The hydrocharging of the web may also be carried out using the method disclosed in the U.S. Pat. No. 7,765,698 (Sebastian et al.).

To assess filtration performance, a variety of filtration testing protocols has been developed. These tests include measurement of the aerosol penetration of the filter web using a standard challenge aerosol such as dioctylphthalate (DOP), which is usually presented as percent of aerosol penetration through the filter web (% Pen) and measurement of the pressure drop across the filter web ($\Delta P$). From these two measurements, a quantity known as the Quality Factor (QF) may be calculated by the following equation:

$$QF = -\ln(\% \text{ Pen}/100)/\Delta P,$$

where ln stands for the natural logarithm. A higher QF value indicates better filtration performance, and decreased QF values effectively correlate with decreased filtration performance. Details for measuring these values are presented in the Examples section. Typically, the filtration medium of this disclosure have measured QF values of 0.3 (mm of $H_2O)^{-1}$ or greater at a face velocity of 6.9 centimeters per second.

To verify that a particular filter medium is electrostatically charged in nature, one may examine its performance before and after exposure to ionizing X-ray radiation. As described in the literature, for example, *Air Filtration* by R. C. Brown (Pergamon Press, 1993) and "Application of Cavity Theory to the Discharge of Electrostatic Dust Filters by X-Rays", A. J. WAKER and R. C. BROWN, *Applied Radiation and Isotopes*, Vol. 39, No. 7, pp. 677-684, 1988, if an electrostatically charged filter is exposed to X-rays, the penetration of an aerosol through the filter will be greater after exposure than before exposure, because the ions produced by the X-rays in the gas cavities between the fibers will have neutralized some of the electric charge. Thus, a plot of penetration against cumulative X-ray exposure can be obtained which shows a steady increase up to a constant level after which further irradiation causes no change. At this point all of the charge has been removed from the filter.

These observations have led to the adoption of another testing protocol to characterize filtration performance, the X-ray Discharge Test. In this testing protocol, select pieces of the filter medium to be tested are subjected to X-ray radiation to discharge the electret web. One attribute of this test is that it confirms that the web is an electret. Because it is known that X-rays quench electret charge, exposure of a filter medium to X-rays and measuring the filter performance before and after this exposure and comparing the filter performances indicates whether the filter medium is an electret. If the filter performance is unchanged after exposure to X-ray radiation, that is indicative that no charge was quenched and the material is not an electret. However, if the filter performance diminishes after exposure to X-ray radiation, that is indicative that the filter medium is an electret.

When the test is run, typically, the filtration performance is measured before and after exposure of the filter medium to the X-ray radiation. A % Penetration Ratio can be calculated according to the following equation: % Penetration Ratio=(ln(initial % DOP Penetration/100)/(ln (% DOP Penetration after 60 min of X-ray exposure/100)))×100, when tested according to the Filtration Performance Test Method, as described in the Examples section below. In order for the web to have sufficient charge for use as a filter, the % Penetration Ratio is typically at least 300%. As the % Penetration Ratio increases, the filtration performance of the web also increases. In some embodiments, the % Penetration Ratio is at least 400%, 500%, or 600%. In especially suitable embodiments, the % Penetration Ratio is at least 750% or 800%. In some embodiments, the web exhibits a % Penetration Ratio of at least 1000%, or at least 1250%.

The initial Quality Factor (prior to exposure to X-rays) is typically at least 0.3 (mm of $H_2O)^{-1}$, more typically at least 0.4 or even 0.5 (mm of $H_2O)^{-1}$ for a face velocity of 6.9 cm/s when tested according to the Filtration Performance Test Method, as described in the Examples section below. In some embodiments, the initial Quality Factor is at least 0.6 or 0.7 (mm of $H_2O)^{-1}$. In other embodiments, the initial Quality Factor is at least 0.8, at least 0.90, at least 1.0, or even greater than 1.0 (mm of $H_2O)^{-1}$. The Quality Factor after 60 minutes exposure to X-rays is typically less than 50% of the initial Quality Factor. In some embodiments, the initial Quality Factor is at least 0.5 (mm of $H_2O)^{-1}$ or greater and the Quality Factor after 60 minutes exposure to X-rays is less than 0.15 (mm of $H_2O)^{-1}$.

The disclosure includes the following embodiments:

Included are embodiments of electret webs. A first embodiment includes an electret web comprising: a thermoplastic resin; and a charge-enhancing additive comprising an arylamino-substituted benzoic acid or an arylamino-substituted benzoic acid salt.

Embodiment 2 is the electret web of embodiment 1, wherein the charge-enhancing additive comprises a substituted or unsubstituted 2-phenylamino benzoic acid, 3-phenylamino benzoic acid, 4-phenylamino benzoic acid or combination thereof.

Embodiment 3 is the electret web of embodiment 1 or 2, wherein the charge-enhancing additive comprises a dimethyl-substituted 2-phenylamino benzoic acid, a dimethyl-substituted 3-phenylamino benzoic acid, a dimethyl-substituted 4-phenylamino benzoic acid or combination thereof.

Embodiment 4 is the electret web of any of embodiments 1-3, wherein the charge-enhancing additive comprises 2-(2,3-dimethylphenyl)amino benzoic acid.

Embodiment 5 is the electret web of embodiment 1, wherein the charge-enhancing additive comprises a substituted or unsubstituted 2-phenylamino benzoic acid metal-containing salt, 3-phenylamino benzoic acid metal-containing salt, 4-phenylamino benzoic acid metal-containing salt or combination thereof.

Embodiment 6 is the electret web of embodiment 5, wherein the charge-enhancing additive comprises a substituted or unsubstituted fenamate salt of divalent calcium, divalent magnesium, or divalent zinc.

Embodiment 7 is the electret web of embodiment 5, wherein the charge-enhancing additive comprises a dimethyl-substituted 2-phenylamino benzoic acid divalent metal-containing salt, a dimethyl-substituted 3-phenylamino benzoic acid divalent metal-containing salt, a dimethyl-substituted 4-phenylamino benzoic acid divalent metal-containing salt or combination thereof.

Embodiment 8 is the electret web of embodiment 5 or 7, wherein the charge-enhancing additive comprises a 2-(2,3-dimethylphenyl)amino benzoic acid salt of a divalent metal.

Embodiment 9 is the electret web of embodiment 5, 7 or 8, wherein the charge-enhancing additive comprises a substituted or unsubstituted mefenamate salt of divalent calcium, divalent magnesium, or divalent zinc.

Embodiment 10 is the electret web of embodiment 5, wherein the charge-enhancing additive comprises a substituted or unsubstituted 2-phenylamino benzoic acid monovalent metal-containing salt, 3-phenylamino benzoic acid monovalent metal-containing salt, 4-phenylamino benzoic acid monovalent metal-containing salt or combination thereof.

Embodiment 11 is the electret web of embodiment 5 or 10, wherein the charge-enhancing additive comprises a substituted or unsubstituted fenamate salt of monovalent sodium, or monovalent lithium.

Embodiment 12 is the electret web of embodiment 5 or 10, wherein the charge-enhancing additive comprises a dimethyl-substituted 2-phenylamino benzoic acid monovalent metal-containing salt, a dimethyl-substituted 3-phenylamino benzoic acid monovalent metal-containing salt, a dimethyl-substituted 4-phenylamino benzoic acid monovalent metal-containing salt or combination thereof.

Embodiment 13 is the electret web of embodiment 5, 10, or 12, wherein the charge-enhancing additive comprises a substituted or unsubstituted mefenamate salt of monovalent sodium, or monovalent lithium.

Embodiment 14 is the electret web of embodiment 5, wherein the charge-enhancing additive comprises a substituted or unsubstituted 2-phenylamino benzoic acid trivalent metal-containing salt, 3-phenylamino benzoic acid trivalent metal-containing salt, 4-phenylamino benzoic acid trivalent metal-containing salt or combination thereof.

Embodiment 15 is the electret web of embodiment 5 or 14, wherein the charge-enhancing additive comprises a substituted or unsubstituted fenamate salt of trivalent aluminum.

Embodiment 16 is the electret web of embodiment 5 or 14, wherein the charge-enhancing additive comprises a dimethyl-substituted 2-phenylamino benzoic acid trivalent metal-containing salt, a dimethyl-substituted 3-phenylamino benzoic acid trivalent metal-containing salt, a dimethyl-substituted 4-phenylamino benzoic acid trivalent metal-containing salt or combination thereof.

Embodiment 17 is the electret web of embodiment 5, 14 or 16, wherein the charge-enhancing additive comprises a 2-(2,3-dimethylphenyl)amino benzoic acid salt of a trivalent metal.

Embodiment 18 is the electret web of embodiment 5, 14, 16, or 17, wherein the charge-enhancing additive comprises a substituted or unsubstituted mefenamate salt of trivalent aluminum.

Embodiment 19 is the electret web of embodiment 5, wherein the charge-enhancing additive comprises a magnesium mefenamate salt.

Embodiment 20 is the electret web of any of embodiments 1-19, wherein the web comprises a non-woven fibrous web.

Embodiment 21 is the electret web of any of embodiments 1-19, wherein the web comprises a film.

Embodiment 22 is the electret web of any of embodiments 1-21, wherein the thermoplastic resin comprises: polyolefin; polyvinyl chloride; polystyrene; polycarbonate; or polyester.

Embodiment 23 is the electret web of any of embodiments 1-22, wherein the charge-enhancing additive comprises 0.02-5.0% by weight of the web.

Embodiment 24 is the electret web of any of embodiments 1-23, wherein the web contains an electrostatic charge, wherein the charge is imparted through corona treatment, hydrocharging, or a combination thereof.

Embodiment 25 is the electret web of any of embodiments 1-23, wherein the web contains an electrostatic charge, wherein the charge is imparted through corona treatment.

Embodiment 26 is the electret web of any of embodiments 1-25, wherein the web further comprises at least one additional additive selected from pigments, light stabilizers, primary and secondary antioxidants, metal deactivators, hindered amines, hindered phenols, fatty acid metal salts, triester phosphites, phosphoric acid salts, fluorine-containing compounds and combinations thereof.

Also disclosed are embodiments of electret filer media. Embodiment 27 is an electret filter medium comprising the electret web of embodiment 1.

Embodiment 28 is an electret filter medium comprising the electret web of embodiment 2.

Embodiment 29 is an electret filter medium comprising the electret web of embodiment 3.

Embodiment 30 is an electret filter medium comprising the electret web of embodiment 4.

Embodiment 31 is an electret filter medium comprising the electret web of embodiment 5.

Embodiment 32 is an electret filter medium comprising the electret web of embodiment 6.

Embodiment 33 is an electret filter medium comprising the electret web of embodiment 7.

Embodiment 34 is an electret filter medium comprising the electret web of embodiment 8.

Embodiment 35 is an electret filter medium comprising the electret web of embodiment 9.

Embodiment 36 is an electret filter medium comprising the electret web of embodiment 10.

Embodiment 37 is an electret filter medium comprising the electret web of embodiment 11.

Embodiment 38 is an electret filter medium comprising the electret web of embodiment 12.

Embodiment 39 is an electret filter medium comprising the electret web of embodiment 13.

Embodiment 40 is an electret filter medium comprising the electret web of embodiment 14.

Embodiment 41 is an electret filter medium comprising the electret web of embodiment 15.

Embodiment 42 is an electret filter medium comprising the electret web of embodiment 16.

Embodiment 43 is an electret filter medium comprising the electret web of embodiment 17.

Embodiment 44 is an electret filter medium comprising the electret web of embodiment 18.

Embodiment 45 is an electret filter medium comprising the electret web of embodiment 19.

Embodiment 46 is an electret filter medium comprising the electret web of embodiment 20.

Embodiment 47 is an electret filter medium comprising the electret web of embodiment 22.

Embodiment 48 is an electret filter medium comprising the electret web of embodiment 23.

Embodiment 49 is an electret filter medium comprising the electret web of embodiment 24.

Embodiment 50 is an electret filter medium comprising the electret web of embodiment 25.

Embodiment 51 is an electret filter medium comprising the electret web of embodiment 26.

Embodiment 52 is an electret filter medium of any of embodiments 27-51, wherein the filter medium has a % Penetration Ratio of at least 300% at a face velocity of 6.9 centimeters per second when tested according to the X-ray Discharge Test.

Embodiment 53 is an electret filter medium of any of embodiments 27-52, wherein the filter medium has an Initial Quality Factor of at least 0.3 (mm of $H_2O)^{-1}$ at a face velocity of 6.9 centimeters per second, and after exposure to X-rays for 60 minutes, a Quality Factor of less than 50% of the Initial Quality Factor, when tested according to the X-ray Discharge Test.

Embodiment 54 is an electret filter medium of any of embodiments 27-53, wherein the filter medium retains at least 85% filtration performance as measured by Quality Factor after aging for 72 hours at 71° C.

Also disclosed are embodiments of compositions. Embodiment 54 is a composition comprising a divalent magnesium mefenamate salt, or the divalent magnesium 2-(2,3-dimethylphenyl)aminobenzoate salt.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: mL=milliliters; M=molarity; RBF=round bottom flask; cm=centimeters; mm=millimeters; min=minutes.

| Table of Abbreviations | |
|---|---|
| Abbreviation or Trade Designation | Description |
| Charge Additive-1 (CA-1) | Magnesium mefenamate salt, see Synthesis Example SE-1 |
| Charge Additive-2 (CA-2) | Magnesium 2-[(2-ethoxyphenyl)amino]-benzoate, see Synthesis Example SE-3 |
| Charge Additive-3 (CA-3) | Chimassorb 944, CAS 71878-19-8 commercially available from BASF |
| Charge Additive-4 (CA-4) | Aluminum mefenamate salt, see Synthesis Example SE-2 |
| Charge Additive-5 (CA-5) | Mefenamic acid, CAS 61-68-7, commercially available from TCI America |
| PMP | Polymethylpentene commercially available as "TPX" from Mitsui Chemicals. |

-continued

| Table of Abbreviations | |
|---|---|
| Abbreviation or Trade Designation | Description |
| PP-1 | Polypropylene, PP-650W, commercially available from LyondellBasell Industries, Houston, TX |
| PP-2 | Polypropylene, Total 3860X, commercially available from Total Petrochemicals USA Inc., Houston, TX |

SYNTHESIS EXAMPLES

Synthesis Example SE-1

Preparation of Magnesium Mefenamate Salt

A sample of 5.05 grams (0.021 moles) of mefenamic acid (98% purity purchased from TCI and used without further purification) was added to a round bottom flask and dissolved in a stoichometric amount of 1 M sodium hydroxide (21 mL). The solution was heated to 80° C. and stirred for one hour. After 1 hour, additional 1 M sodium hydroxide solution was added dropwise until the mefenamic acid appeared to be completely dissolved. The solution was transferred to 500 mL beaker and allowed to cool to room temperature. 21 mL of 1 M $MgCl_2$ solution was poured into the beaker. After one hour, the precipitate was vacuum filtered off and washed repeatedly with water. The filtrate was dried in a vacuum oven.

Synthesis Example SE-2

Preparation of Aluminum Mefenamate Salt

A stock solution of aluminum chloride was prepared by dissolving 99.9 grams of aluminum trichloride hexahydrate with 400 mL of de-ionized water in a 500 mL volumetric flask. The solution was diluted with additional de-ionized water until the final volume was 500 mL to give a final molarity of 0.82 M.

60.00 grams of mefenamic acid was added to a 500 mL RBF and stirred in 242 mL of 1 M sodium hydroxide. The solution was heated to 80° C. and stirred for one hour. After 1 hour, additional 1 M sodium hydroxide solution was added dropwise until the mefenamic acid appeared to be completely dissolved. The mefenamic acid solution was transferred to a 500 mL beaker and allowed to cool to room temperature. 100 mL of the aluminum chloride stock solution was added to the beaker and allowed to stand for over an hour. The precipitate was vacuum filtered and washed repeatedly with water. The filtrate was dried in a vacuum oven.

Synthesis Example SE-3

Magnesium 2-[(2-ethoxyphenyl)amino]-benzoate

A three necked RBF was fitted with a refluxing column and nitrogen was flushed through the system. 0.9896 grams of copper powder and 0.4398 grams of cuprous oxide powder were added to a three necked RBF, followed by 25.01 grams of ortho-phenetidine and 20 grams of ethoxy ethanol. The materials were stirred and 27.10 grams of orthochlorobenzoic acid was added to the RBF followed by 24.0 grams of potassium carbonate. An additional 20 grams of ethoxyethanol were added to the RBF. The reaction was refluxed at 138° C. for 24 hours under nitrogen. The reaction mixture was poured into 400 mL of deionized water and stirred with a small amount of charcoal and filtered through CELITE. The solution was precipitated with 500 mL of 1 N HCl and vacuum filtered. The filtrate was redissolved in 400 mL of water with 50 grams of sodium carbonate and refiltered through CELITE. The solution was precipitated with HCl until it had stopped bubbling. The precipitate was vacuum filtered and dried in a vacuum oven.

The salt was prepared by following a procedure similar to that of Synthesis Example SE-1.

Examples E1-E22 and Comparative Examples C1-C8

For each of the Examples and Comparative Examples, the procedures described below were followed. The data for these Examples are presented in Tables 1-4.

Film Sample Preparation

Step A—Preparation of Flat Films:

For the film examples, 0.2 grams of one of the charge additives described above was selected and compounded for 1 minute with 130 grams polypropylene in a 5 zone 30 mm twin screw extruder. After compounding, the material was cast out of a 4 inch (10.2 cm) drop die and coated between two silicone liners. The nominal coating weight was 1 mil (25.4 micrometers). The extrusion temperatures ranged from 185° C.-250° C. The films (Examples 20-22 and Comparative Example C8) were then charged using Charging Method 1 (see below) and tested using Thermally Stimulated Discharge Current measurement (TSDC) (see below). The data for the film samples are summarized in Tables 4 and 5.

Non-woven Sample Preparation

Step A—Preparation of Melt-blown Microfiber Non-woven Webs:

For each Example, one of the charging additives described above (and in some examples PMP was additionally used) was selected and dry blended with one of the 2 grades of polypropylene at the concentration shown in Table 1, and the blend was extruded as described in Van A. Wente, "Superfine Thermoplastic Fibers," Industrial Engineering Chemistry, vol. 48, pp. 1342-1346. The extrusion temperature ranged from about 250° C.-300° C. and the extruder was a BRABENDER conical twin-screw extruder (commercially available from Brabender Instruments, Inc.) operating at a rate of about 2.5 to 3 kg/hr (5-7 lb/hr). The die was 25.4 cm (10 in) wide with 10 holes per centimeter (25 holes per inch). Melt-blown webs were formed having basis weights of about 50-60 g/m², effective fiber diameters of about 6.5-9.5 micrometers and a thicknesses of about 0.75-2 millimeters.

Step B—Electret Preparation:

Each of the melt-blown webs prepared in Step A (Examples 1-19 and Comparative Examples C1-C7) was charged by one of three electret charging methods: hydrocharging, corona charging, or corona pre-treatment and hydrocharging. Data for the melt-blown web samples are summarized in Tables 1, 2, and 3 below.

Charging Methods

Charging Method 1—Corona Charging:

The selected melt-blown webs or films prepared above were charged by DC corona discharge. The corona charging was accomplished by passing the web on a grounded surface under a corona brush source with a corona current of about 0.01 milliamp per centimeter of discharge source length at a rate of about 3 centimeters per second. The corona source was about 3.5 centimeters above the grounded surface on which the web was carried. The corona source was driven by a positive DC voltage.

Charging Method 2—Hydrocharging:

A fine spray of high purity water having a conductivity of less than 5 microS/cm was continuously generated from a nozzle operating at a pressure of 896 kiloPascals (130 psig) and a flow rate of approximately 1.4 liters/minute. The selected melt-blown webs prepared in Step A were conveyed by a porous belt through the water spray at a speed of approximately 10 centimeters/second while a vacuum simultaneously drew the water through the web from below. Each melt-blown web was run through the hydrocharger twice (sequentially once on each side) and then allowed to dry completely overnight prior to filter testing.

Charging Method 3—Corona Pre-treatment and Hydrocharging:

The selected melt-blown webs prepared in Step A above were pretreated by DC corona discharge as described in Charging Method 1 and then charged by hydrocharging as described in Charging Method 2. Likewise, for each Comparative Example, a melt-blown web was prepared from the same grade of polypropylene as the corresponding Examples web, but no charge additive was added. Table 1 summarizes the specific web characteristics for each of the examples.

Test Methods

Filtration Testing, Non-Woven Melt-Blown Microfiber Webs

The samples were tested for % DOP and/or % NaCl aerosol penetration (% Pen) and pressure drop (ΔP), and the quality factor (QF) was calculated. The filtration performance (% Pen and QF) of the nonwoven microfiber webs were evaluated using an Automated Filter Tester AFT Model 8127 (available from TSI, Inc., St. Paul, Minn.) using dioctylphthalate (DOP) or sodium chloride (NaCl) as the challenge aerosol and a MKS pressure transducer that measured pressure drop (ΔP (mm of $H_2O$)) across the filter. The DOP aerosol was nominally a monodisperse 0.33 micrometer mass median (MMD) diameter having an upstream concentration of 50-200 mg/m³ and a target of 100 mg/m³. The NaCl aerosol MMD is 0.26 with an upstream concentration of 12-20 mg/m³ and a target of 15 mg/m³. The aerosol was forced through a sample of filter media at a calibrated flow rate of 42.5 liters/minute (face velocity of 6.9 cm/s) with the aerosol ionizer turned off for DOP aerosols and turned on for NaCl aerosols. The total testing time was 23 seconds (rise time of 15 seconds, sample time of 4 seconds, and purge time of 4 seconds). The concentration of DOP and NaCl aerosols was measured by light scattering both upstream and downstream of the filter media using calibrated photometers. The DOP % Pen is defined as: % Pen=100×(DOP concentration downstream/DOP concentration upstream) and likewise for NaCl. For each material, 5 separate measurements were made at different locations on the melt-blown web and the results were averaged.

The % Pen and ΔP were used to calculate a QF by the following formula:

$$QF=-\ln(\% \text{ Pen}/100)/\Delta P,$$

where ln stands for the natural logarithm. A higher QF value indicates better filtration performance and decreased QF values effectively correlate with decreased filtration performance. The quality factor of the as generated webs without exposure to other environments is typically designated as "$Q_0$" the Initial Quality Factor.

Thermally Stimulated Discharge Current Measurement, Flat Films

The effective charge density of the flat films was determined by integrating the absolute discharge current measured using a Solomat TSDC/RMA Model 91000 Spectrometer with a pivot electrode, distributed by TherMold Partners, L. P., Stamford, Conn. Samples were cut and secured between a lower fixed electrode and an upper spring-loaded electrode in the Solomat TSDC/RMA. The area of the upper electrode is 0.38 cm$^2$ (about 7 mm in diameter). In the TSDC/RMA instrument, a thermometer is disposed adjacent to, but not touching the sample. The samples were optically dense, such that there are no holes visible through the sample. Since the electrode is about 7 mm in diameter, the samples were cut larger than the 7 mm in diameter. To ensure good electrical contact with the electrodes, the samples were compressed between the electrodes. Air and moisture were evacuated from the sample cell through a series of flushing stages and the cell was back-filled with helium to approximately 1100 mbar. The sample cell was cooled by liquid nitrogen as desired by the specific test protocol.

Current measurements were made while heating the sample at a controlled temperature ramp rate of 5° C./min up to 175° C. During such a thermally stimulated discharge, charges stored in the electret become mobile and are neutralized either at the electrodes or in the bulk sample by recombination with charges of opposite sign. This will generate an external current that shows a number of peaks when recorded as a function of temperature. The shape and location of these peaks depends on charge trapping energy levels and the physical location of the trapping sites. By integrating the current versus temperature plot, one can calculate an effective charge density (pC/mm$^2$).

The films were integrated using the trapezoid rule, where the curve is divided into a series of trapezoids with an area that equals the average height multiplied by the width. The areas are summed together and divided by the heating rate to obtain the amount of charge in Coulombs.

Accelerated Aging Performance

In order to determine the stability of the filtration performance, accelerated aging was tested by comparing the initial quality factor of charged melt-blown webs with its quality factor after storage at different temperatures for different periods of time.

In one test, the webs are stored for 72 hours at 71° C. in air. This quality factor after aging at this condition is typically designated as "$Q_3$". The performance retention is calculated by the following equation:

$$\% \text{ Retention}(Q_3) = (Q_3(\text{after aging for 72 hours at 71° C.})/Q_0(\text{initial})) \times 100\%$$

X-Ray Discharge Test

The Quality Factor and % Pen of sample webs to be tested were determined prior to exposure to X-ray radiation using the test method described above. The Initial Quality Factor is designated as "$QF_0$". The sample web was exposed on each side to X-rays using the system described below, ensuring that the entire sample was uniformly exposed to the X-ray radiation. After X-ray exposure, the sample of filter media was tested again to measure its filter performance (QF and % Pen). The procedure was repeated until the filter performance reached a plateau value, indicating all of the sample's electrostatic charge had been neutralized. The % Penetration Ratio (% Pen Ratio) is also reported. The % Pen Ratio was calculated from the % Pen at 0 minutes and 60 minutes using the equation where ln stands for the natural logarithm:

$$\% \text{ Pen Ratio} = [(\ln(\% \text{ Pen}_{0\,min})/100)/(\ln(\% \text{ Pen}_{60\,min})/100)] \times 100\%.$$

X-ray exposure was carried out using a Baltograph 100/15 CP (Balteau Electric Corp., Stamford, Conn.) X-ray exposure system consisting of a constant potential end grounded generator rated at 100 KV at 10 mA with a beryllium window (0.75 mm inherent filtration) with an output of up to 960 Roentgen/min at 50 cm from the focal spot of 1.5 mm×1.5 mm was employed. The voltage was set to 80 KV with a corresponding current of 8 mA. A sample holder was set up at an approximate distance of 57.2 centimeters (22.5 inches) from the focal spot to produce an exposure of about 580 Roentgen/min.

TABLE 1

Melt Blown Web Preparation

| Example | Resin | Additive | Additive Amount (% wt) | Basis Wt. (g/m$^2$) | Solidity (%) | Eff. Fiber Diam. (μm) | Charging Method |
|---|---|---|---|---|---|---|---|
| C1 | PP-1 | None | 0 | 57.0 | 5.6 | 7.9 | 1 |
| C2 | PP-1 | None | 0 | 57.0 | 5.6 | 7.9 | 1 |
| C3 | PP-1 | None | 0 | 57.0 | 5.6 | 7.9 | 2 |
| C4 | PP-1 | None | 0 | 57.0 | 5.6 | 7.9 | 3 |
| C5 | PP-1 | None | 0 | 57.0 | 5.6 | 7.9 | 3 |
| C6 | PP-2 | None | 0 | 56.0 | 5.6 | 8.4 | 3 |
| C7 | PP-1 | None | 0 | 58.0 | 6.4 | 7.9 | 1 |
| E1 | PP-1 | CA-1 | 0.05 | 58.6 | 5.5 | 7.5 | 1 |
| E2 | PP-1 | CA-1 | 0.10 | 57.5 | 5.9 | 7.6 | 1 |
| E3 | PP-1 | CA-1 | 0.25 | 55.6 | 6.0 | 8.3 | 1 |
| E4 | PP-1 | CA-1 | 0.50 | 57.0 | 5.5 | 8.3 | 1 |
| E5 | PP-1 | CA-1 | 0.50 | 57.0 | 5.5 | 8.3 | 1 |
| E6 | PP-1 | CA-1 | 0.50 | 57.0 | 5.5 | 8.3 | 3 |
| E7 | PP-1 | CA-1 | 1.00 | 57.0 | 6.3 | 8.4 | 1 |
| E8 | PP-1 | CA-1 | 1.00 | 57.0 | 6.3 | 8.4 | 1 |
| E9 | PP-1 | CA-1 | 1.00 | 57.0 | 6.3 | 8.4 | 3 |
| E10 | PP-2 | CA-1 | 0.50 | 57.0 | 6.4 | 10.6 | 3 |
| E11 | PP-2 | CA-1 | 0.12 | 58.0 | 5.9 | 8.8 | 3 |
| E12 | PP-2 | CA-1/PMP | 0.1/1.0 | 55.1 | 6.1 | 8.4 | 3 |

TABLE 1-continued

Melt Blown Web Preparation

| Example | Resin | Additive | Additive Amount (% wt) | Basis Wt. (g/m²) | Solidity (%) | Eff. Fiber Diam. (μm) | Charging Method |
|---|---|---|---|---|---|---|---|
| E13 | PP-1 | CA-1/CA-3 | 0.1/1.0 | 55.0 | 8.1 | 6.4 | 1 |
| E14 | PP-1 | CA-1/CA-3 | 0.1/1.0 | 55.0 | 8.1 | 6.4 | 2 |
| E15 | PP-1 | CA-1/CA-3 | 0.2/1.0 | 54.0 | 8.0 | 6.2 | 1 |
| E16 | PP-1 | CA-1/CA-3 | 0.2/1.0 | 54.0 | 8.0 | 6.2 | 2 |
| E17 | PP-1 | CA-2 | 0.10 | 60.0 | 7.7 | 5.9 | 1 |
| E18 | PP-1 | CA-1/CA-3 | 0.2/1.0 | 54 | 6.2 | 8.0 | 1 |
| E19 | PP-1 | CA-1/CA-3 | 0.1/0.5 | 54 | 6.6 | 8.0 | 1 |

TABLE 2

Filter Testing Data for Melt-Blown Webs

| Example | Test Method | Initial % Pen | Initial ΔP (1/mm H₂O) | $Q_0$ | Aged % Pen | Aged ΔP (1/mm H₂O) | $Q_3$ | $Q_3/Q_0$ |
|---|---|---|---|---|---|---|---|---|
| C1 | DOP | 29.5 | 2.2 | 0.55 | 44.1 | 2.0 | 0.41 | 0.75 |
| C2 | NaCl | 13.5 | 2.3 | 0.89 | 24.1 | 1.9 | 0.74 | 0.83 |
| C3 | DOP | 35.8 | 2.2 | 0.49 | 51.5 | 1.9 | 0.36 | 0.74 |
| C4 | DOP | 13.0 | 2.2 | 0.95 | 19.4 | 1.9 | 0.87 | 0.92 |
| C5 | NaCl | 2.3 | 2.2 | 1.75 | 8.2 | 1.9 | 1.32 | 0.75 |
| C6 | DOP | 7.0 | 2.0 | 1.33 | 15.3 | 1.8 | 1.04 | 0.78 |
| E1 | DOP | 9.1 | 3.4 | 0.70 | 10.0 | 2.9 | 0.79 | 1.13 |
| E2 | DOP | 14.5 | 2.6 | 0.74 | 15.4 | 2.1 | 0.89 | 1.20 |
| E3 | DOP | 16.2 | 2.2 | 0.83 | 15.8 | 1.9 | 0.97 | 1.17 |
| E4 | NaCl | 4.8 | 2.4 | 1.27 | 5.2 | 2.2 | 1.34 | 1.06 |
| E5 | DOP | 10.4 | 2.4 | 0.94 | 11.4 | 2.2 | 0.99 | 1.05 |
| E6 | NaCl | 0.6 | 2.3 | 2.22 | 0.8 | 2.0 | 2.38 | 1.07 |
| E7 | NaCl | 5.0 | 2.5 | 1.20 | 5.9 | 2.3 | 1.23 | 1.03 |
| E8 | DOP | 12.6 | 2.4 | 0.86 | 11.9 | 2.2 | 0.97 | 1.12 |
| E9 | NaCl | 0.7 | 2.3 | 2.16 | 0.9 | 2.1 | 2.24 | 1.04 |
| E10 | DOP | 9.3 | 1.4 | 1.70 | 9.9 | 1.2 | 1.93 | 1.14 |
| E11 | DOP | 4.5 | 1.9 | 1.63 | 4.8 | 1.7 | 1.79 | 1.09 |
| E12 | DOP | 3.2 | 2.2 | 1.56 | 3.9 | 2.1 | 1.54 | 0.99 |
| E13 | DOP | 15.2 | 2.4 | 0.78 | 16.0 | 2.0 | 0.92 | 1.17 |
| E14 | DOP | 1.9 | 2.0 | 1.98 | 1.2 | 1.9 | 2.33 | 1.17 |
| E15 | DOP | 13.8 | 2.4 | 0.83 | 13.8 | 2.1 | 0.94 | 1.14 |
| E16 | DOP | 2.0 | 1.9 | 2.06 | 1.7 | 1.8 | 2.26 | 1.10 |
| E17 | DOP | 17.2 | 2.3 | 0.77 | 17.9 | 2.0 | 0.86 | 1.12 |
| E18 | DOP | 13.8 | 2.4 | 0.83 | 13.8 | 2.1 | 0.94 | 1.14 |

TABLE 3

Filtration Performance before and after Exposure to X-Rays

| | Before Exposure | | | After Exposure (60 minutes) | | | |
|---|---|---|---|---|---|---|---|
| Example | Initial % Pen | Initial ΔP (1/mm H₂O) | $Q_0$ | Initial % Pen | Initial ΔP (1/mm H₂O) | $Q_0$ | % Pen Ratio |
| C7[a] | 21.2 | 3.0 | 0.52 | 74.3 | 3.0 | 0.10 | 522 |
| E19[a] | 15.70 | 2.3 | 0.81 | 76.50 | 2.3 | 0.11 | 691 |

[a]Value for one filter. The values in Table 1 are averaged over five or more filters.

TABLE 4

Film Preparation

| Example | Resin | Additive | Additive Amount (wt %) | Charge Method |
|---|---|---|---|---|
| C8 | PP-2 | None | 0.00 | 1 |
| E20 | PP-2 | CA-1 | 0.10 | 1 |
| E21 | PP-2 | CA-4 | 0.10 | 1 |
| E22 | PP-2 | CA-5 | 0.10 | 1 |

TABLE 5

Charge Density for Films measured by TDSC

| Example | Tm (° C.) | Area (pC/mm²) |
|---|---|---|
| C8 | 146 | 0.22[a] |
| E20 | 125 | 1.20[b] |
| E21 | 150 | 0.41[c] |
| E22 | 141 | 0.82[d] |

[a]Integrated from 90° C. to 155° C.
[b]Integrated from 65° C. to 145° C.
[c]Integrated from 90° C. to 156° C.
[d]Integrated from 65° C. to 155° C.

What is claimed is:

1. An electret web comprising:
   a thermoplastic resin; and
   a charge-enhancing additive comprising an arylamino-substituted benzoic acid or an arylamino-substituted benzoic acid salt.

2. The electret web of claim 1, wherein the charge-enhancing additive comprises a substituted or unsubstituted 2-phenylamino benzoic acid, 3-phenylamino benzoic acid, 4-phenylamino benzoic acid or combination thereof.

3. The electret web of claim 1, wherein the charge-enhancing additive comprises a substituted or unsubstituted 2-phenylamino benzoic acid metal-containing salt, 3-phenylamino benzoic acid metal-containing salt, 4-phenylamino benzoic acid metal-containing salt or combination thereof.

4. The electret web of claim 1, wherein the charge-enhancing additive comprises a substituted or unsubstituted fenamate or mefenamate salt of divalent calcium, divalent magnesium, or divalent zinc.

5. The electret web of claim 1, wherein the charge-enhancing additive comprises a substituted or unsubstituted fenamate or mefenamate salt of monovalent sodium or monovalent lithium.

6. The electret web of claim 1, wherein the charge-enhancing additive comprises a substituted or unsubstituted fenamate or mefenamate salt of trivalent aluminum.

7. The electret web of claim 4, wherein the divalent substituted or unsubstituted fenamate or mefenamate salt comprises a calcium, magnesium, or zinc mefenamate salt.

8. The electret web of claim 7, wherein the divalent substituted or unsubstituted mefenamate salt comprises a magnesium mefenamate salt.

9. The electret web of claim 1, wherein the web comprises a non-woven fibrous web.

10. The electret web of claim 1, wherein the web comprises a film.

11. The electret web of claim 1, wherein the thermoplastic resin comprises:
polyolefin; polyvinyl chloride; polystyrene; polycarbonate; or polyester.

12. The electret web of claim 1, wherein the charge-enhancing additive comprises 0.02-5.0% by weight of the web.

13. The electret web of claim 1, wherein the web contains an electrostatic charge, wherein the charge is imparted through corona treatment, hydrocharging, or a combination thereof.

14. The electret web of claim 1, wherein the web contains an electrostatic charge, wherein the charge is imparted through corona treatment.

15. The electret web of claim 1, wherein the web further comprises at least one additional additive selected from pigments, light stabilizers, primary and secondary antioxidants, metal deactivators, hindered amines, hindered phenols, fatty acid metal salts, triester phosphites, phosphoric acid salts, fluorine-containing compounds and combinations thereof.

16. An electret filter medium comprising the electret web of claim 1.

17. The electret filter medium of claim 16, wherein the filter medium has a % Penetration Ratio of at least 300% at a face velocity of 6.9 centimeters per second when tested according to the X-ray Discharge Test.

18. The electret filter medium of claim 16, wherein the filter medium has an Initial Quality Factor of at least 0.3 (mm of $H_2O)^{-1}$ at a face velocity of 6.9 centimeters per second, and after exposure to X-rays for 60 minutes, a Quality Factor of less than 50% of the Initial Quality Factor, when tested according to the X-ray Discharge Test.

19. The electret filter medium of claim 16, wherein the filter medium retains at least 85% filtration performance as measured by Quality Factor after aging for 72 hours at 71° C.

20. A composition comprising a magnesium 2-(2,3-dimethylphenyl)aminobenzoate salt.

* * * * *

UNITED STATES PATENT AND TRADEMARK OFFICE
CERTIFICATE OF CORRECTION

PATENT NO. : 9,815,067 B2
APPLICATION NO. : 14/784634
DATED : November 14, 2017
INVENTOR(S) : Nathan Schultz Page 1 of 1

It is certified that error appears in the above-identified patent and that said Letters Patent is hereby corrected as shown below:

In the Specification

<u>Column 7</u>
Line 62, delete "3,-" and insert -- 3- --, therefor.

<u>Column 14</u>
Line 23 (approx.), delete "stoichometric" and insert -- stoichiometric --, therefor.

<u>Column 18</u>
Line 9 (approx.), delete "72hours" and insert -- 72 hours --, therefor.

Signed and Sealed this
Nineteenth Day of March, 2019

Andrei Iancu
*Director of the United States Patent and Trademark Office*